United States Patent
Cao et al.

(10) Patent No.: US 9,450,675 B2
(45) Date of Patent: Sep. 20, 2016

(54) METHOD AND APPARATUS FOR ESTIMATING CROSS-PHASE MODULATION IMPAIRMENTS

(71) Applicant: FUJITSU LIMITED, Kawasaki-shi, Kanagawa (JP)

(72) Inventors: Yinwen Cao, Beijing (CN); Weizhen Yan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 13/857,614

(22) Filed: Apr. 5, 2013

(65) Prior Publication Data
US 2013/0266311 A1 Oct. 10, 2013

(30) Foreign Application Priority Data

Apr. 6, 2012 (CN) .......................... 2012 1 0100071

(51) Int. Cl.
*H04B 10/2557* (2013.01)
*H04B 10/2569* (2013.01)

(52) U.S. Cl.
CPC ...... *H04B 10/2557* (2013.01); *H04B 10/2569* (2013.01)

(58) Field of Classification Search
CPC ............ H04B 10/077; H04B 10/0773; H04B 10/2557
See application file for complete search history.

(56) References Cited

U.S. PATENT DOCUMENTS

2003/0072513 A1* 4/2003 Glingener .............. G02B 6/278 385/11

OTHER PUBLICATIONS

Do et al, Measurement of the complex polarization mode dispersion vector using Jones matrix analysis (published in Applied Optics vol. 46, Issue 6, pp. 916-921, 2007).*

Lin et al, Effects of Polarization-Mode Dispersion on Cross-Phase Modulation in Dispersion-Manage Wavelength-Division-Multiplexed Systems (published in Journal of Lightwave Technology, vol. 22, No. 4, Apr. 2004).*

Foschini et al, The Statistics of PMD-Induced Chromatic Fiber Dispersion (published in Journal of Lightwave Technology, vol. 17, No. 9, Sep. 1999).*

Xia et al., "PMD-induced Nonlinear Penalty Reduction in Coherent Polarization-Multiplexed QPSK Transmission", ECOC 2010, Sep. 19-23, 2010, Torino, Italy, 3pp.

Tao et al., "Simple Fiber Model for Determination of XPM Effects", Journal of Lightwave Technology, vol. 29, No. 7, Apr. 2011, pp. 974-986.

Serena et al., "Nonlinear Penalty Reduction Induced by PMD in 112 Gbit/s WDM PDM-QPSK Coherent Systems", ECOC 2009, Sep. 2009, Vienna, Austria, 2 pp.

Winter et al., "A Statistical Treatment of Cross-Polarization Modulation in DWDM Systems", Journal of Lightwave Technology, vol. 27, No. 17, Sep. 2009, pp. 3739-3751.

* cited by examiner

*Primary Examiner* — David Payne
*Assistant Examiner* — Casey Kretzer
(74) *Attorney, Agent, or Firm* — Staas & Halsey LLP (57) ABSTRACT

A system for estimating cross-phase modulation (XPM) impairments, wherein the method comprises: determining, according to a pump Jones matrix of a pump channel and a probe Jones matrix of a probe channel of each of fiber spans except for the first fiber span in a fiber transmission system, a polarization mode dispersion (PMD)-induced relative polarization status rotation matrix between channels of the each of fiber spans; and determining, according to the rotation matrix of the each of fiber spans, dispersion of a pump signal of the each of fiber spans, differential delay of the pump signal relative to a probe signal of the each of fiber spans and a gain of the each of fiber spans, polarization crosstalk and phase noise of the XPM impairments in the fiber transmission system. This allows the XPM impairments in the effect of the polarization mode dispersion to be quickly and accurately estimated.

4 Claims, 3 Drawing Sheets
(1 of 3 Drawing Sheet(s) Filed in Color)

501 determining, according to a pump Jones matrix of a pump channel and a probe Jones matrix of a probe channel of each of fiber spans except for the first fiber span in a fiber transmission system, a PMD-induced relative polarization status rotation matrix between channels of the each of fiber spans

502 determining, according to the relative polarization status rotation matrix of the each of fiber spans, dispersion of a pump signal of the each of fiber spans, differential delay of the pump signal relative to a probe signal of the each of fiber spans and a gain of the each of fiber spans, polarization crosstalk and phase noise of the XPM impairments in the fiber transmission system

METHOD AND APPARATUS FOR ESTIMATING CROSS-PHASE MODULATION IMPAIRMENTS

CROSS-REFERENCE TO RELATED APPLICATION

This application is based upon and claims the benefit of priority of the prior Chinese Patent Application No. 201210100071.X, filed on Apr. 6, 2012, the entire contents of which are incorporated herein by reference.

TECHNICAL FIELD

The present invention relates to the fiber communications and, in particular, to a method and an apparatus for estimating cross-phase modulation (XPM) impairments in the effect of polarization mode dispersion.

BACKGROUND ART

Phase noise and polarization crosstalk resulted from the cross-phase modulation are one of the main sources leading to the cost of a dense wavelength division multiplexing system. Traditional methods for researching the XPM comprise Split Step Fourier (SSF) simulation and a transmission experiment. However, the SSF simulation is very time-consuming and the number of time windows and channels which can be studied is very limited; and the transmission experiment needs to spend a lot of manpower and material resources. In order to research the mechanism of the cross-phase modulation better so as to suppress and compensate impairments of related signal, various methods have been proposed successively (referring to documents Z. Tao et al., JLT, vol. 29, pp. 974-986, 2011; M. Winter et al., JLT, vol. 27, pp. 3739-3751, 2009). However, polarization mode dispersion is not taken into consideration in these methods, while the polarization mode dispersion does exist in a practical fiber transmission system. Moreover, the researches (referring to documents P. Serena et al, ECOC, Paper 10.4.3, 2009; C. Xia et al, ECOC, Paper Th. 10. E, 5, 2010) have shown that the polarization mode dispersion is conducive to reduction of the system impairments due to the cross-phase modulation in a fiber link including dispersion management. Therefore, when the impairments of related signal are suppressed and compensated, it is needed to consider the effects brought by the polarization mode dispersion.

It should be noted that the above introduction to the background art is given for the clear and complete description of the technical solution of the present invention and for the understanding by those skilled in the art. The above technical solutions should not be deemed as being known to those skilled in the art for having been described in the background art of the present invention.

SUMMARY OF THE INVENTION

In view of the problems pointed out in the Background Art, the present invention is proposed.

The object of the embodiments of the present invention is to provide a method for estimating cross-phase modulation (XPM) impairments, so as to quickly and accurately estimate the cross-phase modulation (XPM) impairments in the effect of the polarization mode dispersion.

According to an aspect of the embodiments of the present invention, there is provided an apparatus for estimating cross-phase modulation (XPM) impairments, wherein the apparatus comprises:

a first calculation unit for calculating, according to a pump Jones matrix of a pump channel and a probe Jones matrix of a probe channel of each of fiber spans except for the first fiber span in a fiber transmission system, a polarization mode dispersion (PMD)-induced relative polarization status rotation matrix between channels of the each of fiber spans; and a second calculation unit for calculating, according to the relative polarization status rotation matrix of the each of fiber spans, dispersion of a pump signal of the each of fiber spans, differential delay of the pump signal relative to a probe signal of the each of fiber spans and a gain of the each of fiber spans, polarization crosstalk and phase noise of the XPM impairments in the fiber transmission system.

According to another aspect of the embodiments of the present invention, there is provided a method for estimating cross-phase modulation (XPM) impairments, wherein the method comprises:

determining, according to a pump Jones matrix of a pump channel and an probe Jones matrix of an probe channel of each of fiber spans except for the first fiber span in a fiber transmission system, a relative polarization status rotation matrix between channels induced by polarization mode dispersion (PMD) of the each of fiber spans; and determining, according to the relative polarization status rotation matrix of the each of fiber spans, dispersion of a pump signal of the each of fiber spans, differential delay of the pump signal relative to a probe signal of the each of fiber spans and a gain of the each of fiber spans, polarization crosstalk and phase noise of the XPM impairments in the fiber transmission system.

The advantages of the embodiments of the present invention exist in that the cross-phase modulation (XPM) impairments in the effect of the polarization mode dispersion can be quickly and accurately estimated.

Particular embodiments of the present invention will be described in detail below with reference to the following description and attached drawings and the manners of using the principle of the present invention are pointed out. It should be understood that the implementation of the present invention is not limited thereto in scope. Rather, the invention includes all changes, modifications and equivalents coming within the spirit and terms of the appended claims.

Features which are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. To facilitate illustrating and describing some parts of the present invention, corresponding portions of the drawings may be exaggerated or reduced in size. Elements and features depicted in one drawing or embodiment of the present invention may be combined with elements and features depicted in one or more additional drawings or embodiments. Moreover, in the drawings, like reference numerals designate corresponding parts throughout the several views and may be used to designate like or similar parts in more than one embodiment.

The patent or application file contains at least one drawing executed in color. Copies of this patent or patent application publication with color drawing will be provided by the Office upon request and payment of the necessary fee.

In the drawings.

DETAILED DESCRIPTION OF THE INVENTION

The foregoing and other features of the embodiments of the present invention will be apparent through the following description with reference to the drawings. These embodiments are merely illustrative and not intended to limit the present invention. For the easy understanding of the principle and the embodiments of the present invention by those skilled in the art, the description of the embodiments of the present invention will be given taking multi-pump multi-span of a wavelength division multiplexing system as an example; however, it should be understood that the embodiments of the present invention are not limited to such a system.

In a wavelength division multiplexing system, a channel is arbitrarily selected as a probe channel, the rest of channels are served as a pump channel. The impact on the system due to the cross-phase modulation can be represented as:

$$U_{1\_XPM}(t) = W(t) U_{1\_wloXPM}(t)$$

where, $U_{1\_wloXPM}(t)$ is a waveform of a probe signal after the single-channel transmission, $U_{1\_XPM}(t)$ is a waveform in which the cross-phase modulation is taken into consideration after the multi-channel transmission, $W(t)$ is a Jones matrix which denotes the impact of the cross-phase modulation, and the expression of $W(t)$ is:

$$W(t) = e^{j\phi(t)} \begin{bmatrix} \sqrt{1-|w_{xy}(t)|^2}\, e^{j\Delta\phi(t)/2} & w_{yx}(t) \\ w_{xy}(t) & \sqrt{1-|w_{yx}(t)|^2}\, e^{-j\Delta\phi(t)/2} \end{bmatrix}$$

where, $w_{xy}$ represents the crosstalk of the x polarization status relative to the y polarization status, $w_{yx}$ represents the crosstalk of the y polarization status relative to the x polarization status, and they are related to a polarization crosstalk term of the pump channel.

In the above expression, $\phi = (\phi_x + \phi_y)/2$, $\Delta\phi = \phi_x - \phi_y$, where, $\phi_x$ represents the phase noise of the XPM on the x polarization status, $\phi_y$ represents the phase noise of the XPM on they polarization status, and they are related to a phase noise term.

Figure 1:
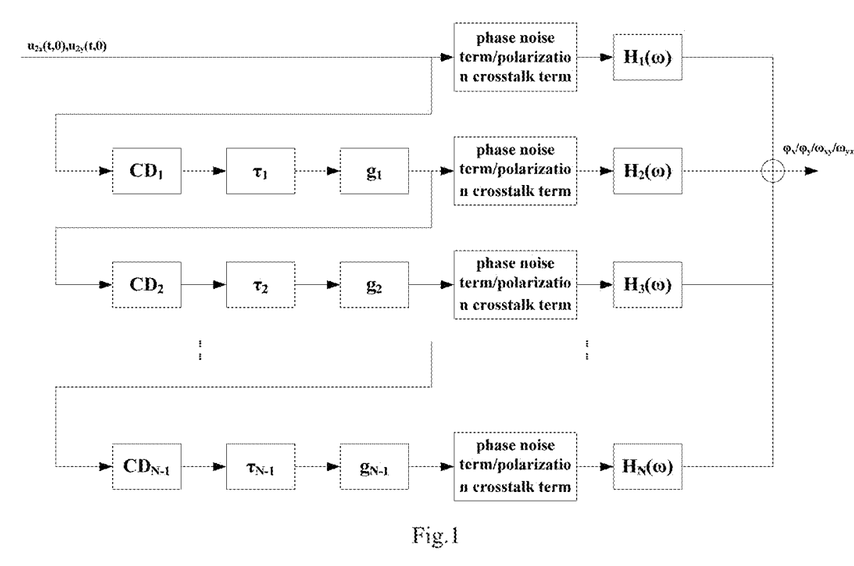
FIG. 1 is a schematic diagram of the composition of an apparatus for estimating cross-phase modulation (XPM) impairments.

FIG. 1 shows a schematic diagram of calculating $w_{xy}$, $w_{yx}$, $\phi_x$ and $\phi_y$ when the number of fiber spans of the fiber transmission system is N. In FIG. 1, $CD_i$ is dispersion of a pump signal in the i-th fiber span, $\tau_i$ is differential delay of the pump channel relative to the probe channel, $g_i$ is a gain of an optical amplifier, and $H_i(\omega)$ is an XPM filter of the i-th fiber span.

It can be obtained according to the design in FIG. 1 that: the polarization crosstalk of the y polarization status of the pump channel to the x polarization status of the pump channel can be represented as:

$$w_{yx} = \sum_{i=0}^{N-1} j u_{2x}(t,i) u_{2y}^*(t,i) \otimes h_{i+1}(t).$$

the polarization crosstalk of the x polarization status of the pump channel to the y polarization status of the pump channel can be represented as:

$$w_{xy} = \sum_{i=0}^{N-1} j u_{2y}(t,i) u_{2x}^*(t,i) \otimes h_{i+1}(t).$$

the phase noise of the XPM of the pump channel on the x polarization status of the pump channel:

$$\varphi_x = \sum_{i=0}^{N-1} (2|u_{2x}(t,i)|^2 + |u_{2y}(t,i)|^2) \otimes h_{i+1}(t).$$

the phase noise of the XPM of the pump channel on the y polarization status of the pump channel:

$$\varphi_y = \sum_{i=0}^{N-1} (2|u_{2y}(t,i)|^2 + |u_{2x}(t,i)|^2) \otimes h_{i+1}(t).$$

where, $h_{i+1}(t) = \text{IFFT}(H_{i+1}(\omega))$ is the impulse response of a filter; $\otimes$ represents the convolution;

$u_{2x}(t,i) = g_i u_{2x}(t,i-1) \otimes \text{IFFT}(CD_i) \otimes \text{IFFT}(\tau_i);$ $u_{2y}(t,i) = g_i u_{2y}(t,i-1) \otimes \text{IFFT}(CR_i) \otimes \text{IFFT}(\tau_i);$ IFFT (CR) is the impulse response of the dispersion of pump signals of the each of fiber spans; and IFFT($\tau_i$) is the impulse response of the differential delay of the pump signals relative to probe signals of the each of fiber spans.

By using the design in FIG. 1, the polarization crosstalk term and the phase noise term of the pump channel can be obtained according to the above formulae, whereby the Jones matrix W(t) can be determined, thus capable of obtaining a signal in which the XPM is taken into consideration after the multi-channel transmission.

However, as introduced in Background Art, the method for estimating the XPM impairments cannot truly reflect the channel state due to not taking the effect brought by the polarization mode dispersion into consideration.

Embodiment 1

Figure 2:
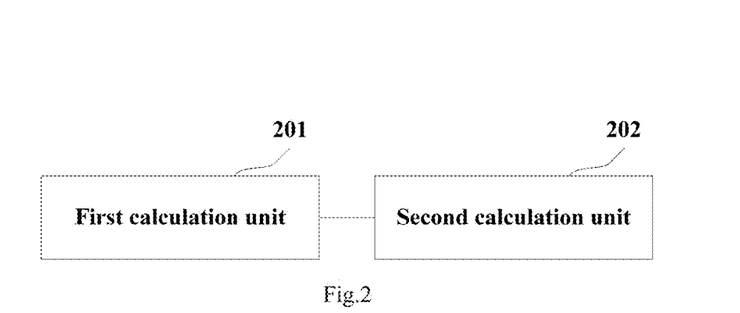
FIG. 2 is a schematic diagram of the composition of an apparatus for estimating cross-phase modulation (XPM) impairments according to an embodiment of the present invention.

An embodiment of the present invention provides an apparatus for estimating cross-phase modulation (XPM) impairments. FIG. 2 is a schematic diagram of the composition of the apparatus; referring to FIG. 2, the apparatus comprises:

a first calculation unit 201 for calculating, according to a pump Jones matrix of a pump channel and a probe Jones matrix of a probe channel of each of fiber spans except for the first fiber span in a fiber transmission system, a polarization mode dispersion (PMD)-induced relative polarization status rotation matrix between channels of the each of fiber spans; and a second calculation unit 202 for calculating, according to the relative polarization status rotation matrix of the each of fiber spans, dispersion of a pump signal of the each of fiber spans, differential delay of the pump signal relative to a probe signal of the each of fiber spans and a gain of the each of fiber spans, polarization crosstalk and phase noise of the XPM impairments in the fiber transmission system.

In an embodiment, the first calculation unit 201 comprises (N-1) first calculation modules, and wherein N is the number of the fiber spans of the fiber transmission system and each of the first calculation modules is configured for calculating the PMD-induced relative polarization status rotation matrix between channels of one fiber span according to the following formula:

$$J_{Relative} = \frac{J_{pump}}{J_{probe}} = \frac{\prod_{m=1}^{M}(R_m \times D_m)}{\prod_{m=1}^{M} R_m}$$

In this embodiment, the pump Jones matrix $J_{pump}$ of the pump channel is a value after the product of a random rotation matrix $R_m$ and a differential group delay matrix $D_m$ is subjected to M iterations, that is, $$J_{pump} = \prod_{m=1}^{M}(R_m \times D_m).$$

The probe Jones matrix $J_{profile}$ of the probe channel is a value after the random rotation matrix $R_m$, is subjected to M iterations, that is, $$J_{probe} = \prod_{m=1}^{M} R_m.$$

In this embodiment, the PMD-induced relative polarization status rotation matrix $J_{relative}$ between channels of each of the fiber spans is namely a quotient of the pump Jones matrix $J_{pump}$ and the probe Jones matrix $J_{prob}$, that is, $$J_{Relative} = \frac{J_{pump}}{J_{probe}}.$$

In this case, $R_m$ is the random rotation matrix which is used to characterize the change of the birefringence axis in the fiber. $D_m$ is the differential group delay matrix which is used to characterize a PMD-induced group delay difference between the fast and slow axes in the fiber.

$$R_m = \begin{bmatrix} \cos\theta & -\sin\theta e^{j\delta} \\ \sin\theta e^{-j\delta} & \cos\theta \end{bmatrix}, \text{ and } D_m = \begin{bmatrix} e^{j\Delta\omega\tau/2} & 0 \\ 0 & e^{-j\Delta\omega\tau/2} \end{bmatrix}.$$

In an implementation,

In the above expression, $\theta$ meets a uniform distribution on $[0,\pi]$, $\sin\delta$ meets a uniform distribution on $[-1,1]$, $\Delta\omega$ is a carrier interval between the pump signal and the probe signal, and $\Delta\omega=0$ for the probe signal, and $\tau$ is a group delay difference of each of the iterations and the relationship between $\tau$ and the coefficient of the PMD $D_{PMD}$ is $\tau = D_{PMD} \times \sqrt{L/M}$, where, L is the length of the current fiber span, and M is the number of iterations.

Since the number of iterations M is adjustable, in another implementation, in order to further simplify the operation, $\delta$ is omitted, that is, let $\delta=0$, then the random rotation matrix $R_m$ is transformed into:

$$R_m = \begin{bmatrix} \cos\theta & -\sin\theta \\ \sin\theta & \cos\theta \end{bmatrix}$$

Figure 3:
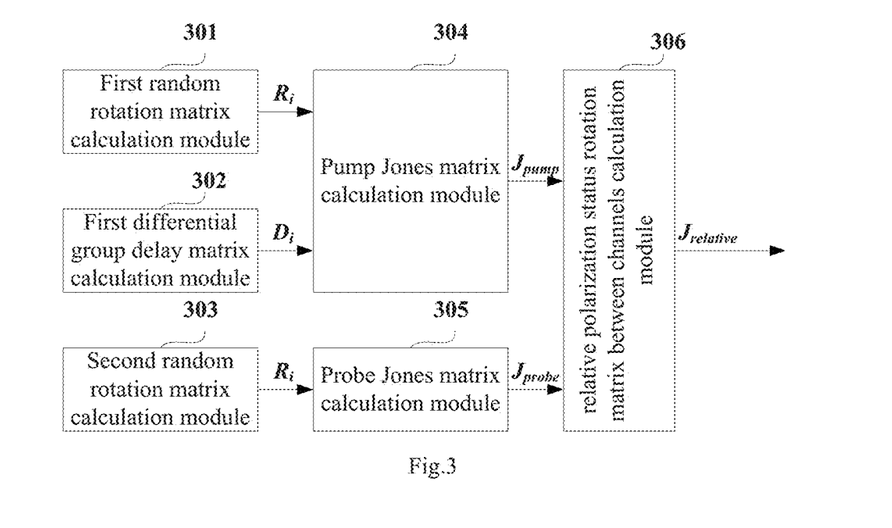
FIG. 3 is a schematic diagram of the composition of a first calculation module of a first calculation unit according to the embodiment shown in FIG. 2.

FIG. 3 is a schematic diagram of the composition of an example of a first calculation module according to the embodiment of the present invention; referring to FIG. 3, the first calculation module comprises: a first random rotation matrix calculation module 301, a first differential group delay matrix calculation module 302, a second random rotation matrix calculation module 303, a pump Jones matrix calculation module 304, a probe Jones matrix calculation module 305, and a relative polarization status rotation matrix between channels calculation module 306.

In this case, the first random rotation matrix calculation module 301 and the second random rotation matrix calculation module 303 are used for calculating the random rotation matrix according to the formula $$R_m = \begin{bmatrix} \cos\theta & -\sin\theta e^{j\delta} \\ \sin\theta e^{-j\delta} & \cos\theta \end{bmatrix}$$

or the formula $$R_m = \begin{bmatrix} \cos\theta & -\sin\theta \\ \sin\theta & \cos\theta \end{bmatrix},$$

where, $\theta$ meets a uniform distribution on $[0,\pi]$, and $\sin\delta$ meets a uniform distribution on $[-1,1]$.

In this case, the first differential group delay matrix calculation module 302 is used for calculating the differential group delay matrix according to the formula $$D_m \begin{bmatrix} e^{j\Delta\omega\tau/2} & 0 \\ 0 & e^{-j\Delta\omega\tau/2} \end{bmatrix},$$

where, $\Delta\omega$ is a carrier interval between the pump signal and the probe signal, and $\Delta\omega=0$ for the probe signal, $\tau$ is a group delay difference of each of the iterations and the relationship between $\tau$ and the coefficient of the PMD $D_{PMD}$ is $\tau=D_{PMD}\times\sqrt{L/M}$, where, L is the length of the current fiber span, and M is the number of iterations.

In this case, the pump Jones matrix calculation module 304 is configured to calculate the pump Jones matrix according to the formula $$J_{pump} = \prod_{i=1}^{M} (R_m \times D_m)$$

by using the calculation result of the first random rotation matrix calculation module 301 and the first differential group delay matrix calculation module 302.

In this case, the probe Jones matrix calculation module 305 is configured to calculate the probe Jones matrix according to the formula $$J_{probe} = \prod_{i=1}^{M} R_m$$

by using the calculation result of the second random rotation matrix calculation module 303.

In this case, the relative polarization status rotation matrix between channels calculation module 306 is configured to calculate the relative polarization status rotation matrix between channels according to the formula $$J_{Relative} = \frac{J_{pump}}{J_{probe}}$$

by using the calculation result of the pump Jones matrix calculation module 304 and the probe Jones matrix calculation module 305.

FIG. 3 is a block diagram of calculating the relative polarization status between the pump signal and the probe signal. It needs to be noted that, in the process of calculation, the PMD-induced intra-channel impairments and the depolarization effect are not taken into consideration, and the PMD-induced change of the relative polarization status between channels is only considered. Furthermore, in FIG. 3, two random rotation matrix calculation modules, i.e., the first random rotation matrix calculation module 301 and the second random rotation matrix calculation module 303, are illustrated; however, in the particular implementation, these two modules can be merged into one module.

In an embodiment, the relative polarization status rotation matrix can be represented as $$J_{relative} = \begin{bmatrix} j_{11} & j_{12} \\ j_{21} & j_{22} \end{bmatrix},$$

and the second calculation unit 202 is configured to determine the polarization crosstalk and the phase noise of the XPM impairments in the fiber transmission system according to the following formulae:

calculating the polarization crosstalk term of the y polarization status of an input signal to the x polarization status thereof according to the formula $$w_{yx} = \sum_{i=0}^{N-1} j u_{2x}(t, i) u_{2y}^*(t, i) \otimes h_{i+1}(t);$$

calculating the polarization crosstalk term of the x polarization status of an input signal to the y polarization status thereof according to the formula $$w_{xy} = \sum_{i=0}^{N-1} j u_{2y}(t, i) u_{2x}^*(t, i) \otimes h_{i+1}(t);$$

calculating the phase noise of the XPM on the x polarization status according to the formula
$\phi_x = \sum_{i=0}^{N-1} (2|u_{2x}(t,i)|^2 + |u_{2y}(t,i)|^2) \otimes h_{i+1}(t)$; and calculating the phase noise of the XPM on the y polarization status according to the formula $$\varphi_y = \sum_{i=0}^{N-1} (2|u_{2y}(t, i)|^2 + |u_{2x}(t, i)|^2) \otimes h_{i+1}(t);$$

where,
$u_{2x}(t,i)=g_1 u_{2x}(t,i-1) \otimes \text{IFFT}(CD_i) \otimes \text{IFFT}(\tau_i);$
$u_{2y}(t,i)=g_i u_{2y}(t,i-1) \otimes \text{IFFT}(CD_i) \otimes \text{IFFT}(\tau_i);$ where,
the $u'_{2x}(t,i-1)$ and the $u'_{2y}(t,i-1)$ respectively are values after the $u_{2x}(t,i-1)$ and the $u_{2y}(t,i-1)$ being processed by the relative polarization status rotation matrix, that is, $u'_{2x}(t,i-1)=j_{11}\times u_{2x}(t,i-1)+j_{12}\times u_{2y}(t,i-1);$
$u'_{2y}(t,i-1)=j_{21}\times u_{2x}(t,i-1)+j_{22}\times u_{2y}(t,i-1);$ where,
$h_{i+1}(t)=\text{IFFT}(H_{i+1}(\omega))$ is the impulse response of a filter;
$\otimes$ represents the convolution;
IFFT $(CD_i)$ is the impulse response of the dispersion of the pump signals of the each of fiber spans; and
IFFT$(\tau_i)$ is the impulse response of the differential delay of the pump signals relative to probe signals of the each of fiber spans.

In this embodiment, the second calculation unit 202 comprises:

N second calculation modules, each of the second calculation modules configured for calculating a polarization crosstalk term and a phase noise term of one fiber span;

N filters, each of the filters configured for respectively performing the filtering processing on the phase noise term and the polarization crosstalk term of each of the fiber spans; and one adder for adding the filtering-processed phase noise terms of all the fiber spans and adding the filtering-processed polarization crosstalk terms of all the fiber spans to obtain the polarization crosstalk and the phase noise of the XMP impairments in the fiber transmission system;

wherein N is the number of the fiber spans in the fiber transmission system; and wherein the first second calculation module calculates the phase noise term and the polarization crosstalk term of the first fiber span according to the pump signal of the first fiber span; and each of the second calculation modules except for the first second calculation module calculates the phase noise term and the polarization crosstalk term of the fiber span corresponding to it according to the product of the pump signal and the relative polarization status rotation matrix, the dispersion of the pump signal, the differential delay of the pump signal relative to the probe signal and the gain of the fiber span corresponding to it.

In this embodiment, when each of the second calculation module, except for the first second calculation module, calculates the phase noise term and the polarization crosstalk term of a fiber span corresponding thereto, not only the dispersion of the pump signal, the differential delay of the pump signal relative to the probe signal and the gain in the fiber span are taken into consideration, but also the PMD-induced relative polarization status rotation between channels (i.e., the probe channel and the pump channel) is taken into consideration. In particular, before the each of the second calculation module calculates the phase noise term and the polarization crosstalk term of each fiber span, the PMD-induced relative polarization status rotation between the pump signal and the probe signal is taken into consideration and the pump signal is multiplied by the calculated relative polarization status rotation matrix.

Figure 4:
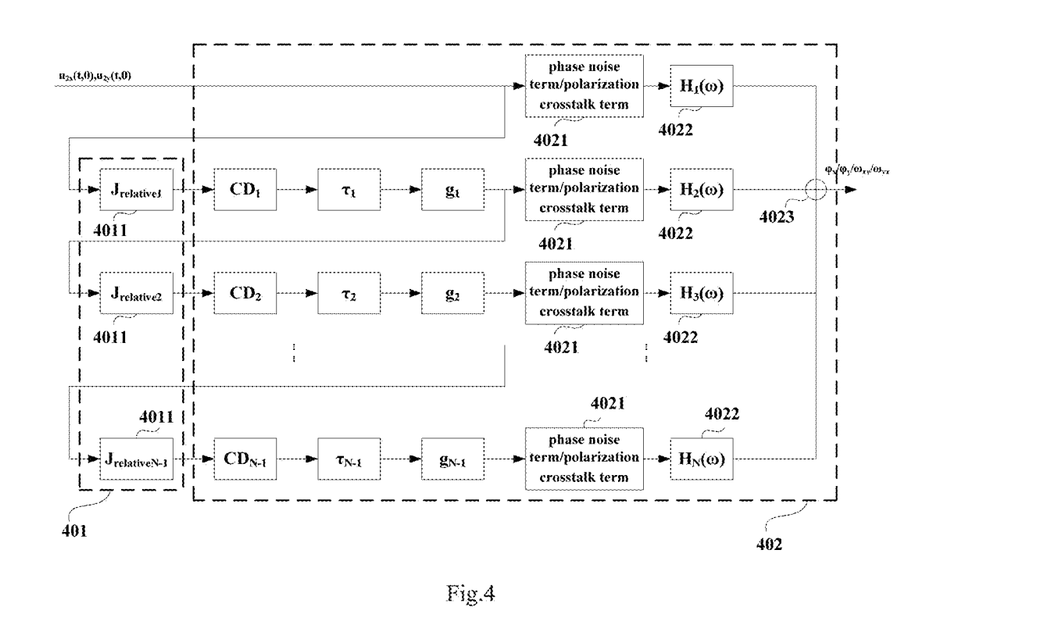
FIG. 4 is a schematic diagram of the composition of the apparatus for estimating cross-phase modulation (XPM) impairments according to the embodiment shown in FIG. 2.

FIG. 4 is a schematic diagram of the composition of an example of the apparatus for estimating cross-phase modulation (XPM) impairments according to the embodiment of the present invention; referring to FIG. 4, the apparatus for estimating cross-phase modulation (XPM) impairments comprises: a first calculation unit 401 and a second calculation unit 402.

In FIG. 4, the first calculation unit 401 comprises (N−1) first calculation modules 4011, each of the first calculation modules 4011 is configured for calculating the relative polarization status rotation matrix of a fiber span corresponding thereto. The first calculation modules 4011 can be implemented by the first calculation module as shown in FIG. 3, and the contents thereof are incorporated herein, which will not be described any further.

In FIG. 4, the second calculation unit 402 comprises N second calculation modules 4021, N filters 4022, and one adder 4023.

In an implementation, the second calculation modules 4021 is configured to calculate a polarization crosstalk term and a phase noise term of a fiber span corresponding thereto according to the following formulae:

$$ju_{2x}(t,i)u_{2y}^*(t,i);$$

$$ju_{2y}(t,i)u_{2x}^*(t,i);$$

$$2|u_{2x}(t,i)|^2+|u_{2x}(t,i)|^2;$$

$$2|u_{2y}(t,i)|^2+|u_{2x}(t,i)|^2;$$

where, the meaning of each parameter is as described above, $ju_{2x}(t,i)u_{2y}^*(t,i)$ is the crosstalk term of the y polarization status to the x polarization status in the fiber span, $ju_{2y}(t,i)u_{2x}^*(t,i)$ is the crosstalk term of the x polarization status to the y polarization status in the fiber span, $2|u_{2x}(t,i)|^2+|u_{2y}(t,i)|^2$ is the phase noise term of the XPM on the x polarization status, $2|u_{2y}(t,i)|^2+|u_{2x}(t,i)|^2$ is the phase noise term of the XPM on the y polarization status, i is a current fiber span, i is from 1 to N, t is a current moment, j is an imaginary number, $u_{2x}$ is a signal of the pump channel on the x polarization status, and $u_{2y}$ is a signal of the pump channel on they polarization status.

In this implementation, the filters 4022 filter respectively the phase noise term and the polarization crosstalk term of a fiber span corresponding thereto, that is, a convolution operation is performed on the phase noise term of the fiber span corresponding thereto and an impulse response of the filter to obtain the phase noise of the fiber span corresponding thereto; and, a convolution operation is performed on the polarization crosstalk term of the fiber span corresponding thereto and an impulse response of the filter to obtain the polarization crosstalk of the fiber span corresponding thereto.

That is, $$ju_{2x}(t,i)u_{2y}^*(t,i) \otimes h_{i+1}(t);$$

$$ju_{2y}(t,i)u_{2x}^*(t,i) \otimes h_{i+1}(t);$$

$$(2|u_{2x}(t,i)|^2+|u_{2y}(t,i)|^2) \otimes h_{i+1}(t);$$

$$(2|u_{2y}(t,i)|^2+|u_{2x}(t,i)|^2) \otimes h_{i+1}(t).$$

where, the meaning of each parameter is as described above.

In this implementation, the adder 4023 respectively adds the filtering-processed phase noise terms of all the fiber spans and adds the polarization crosstalk terms of all the fiber spans to obtain the phase noise term and the polarization crosstalk term in the fiber transmission system.

That is, $$w_{yx} = \sum_{i=0}^{N-1} ju_{2x}(t,i)u_{2y}^*(t,i) \otimes h_{i+1}(t);$$

$$w_{xy} = \sum_{i=0}^{N-1} ju_{2y}(t,i)u_{2x}^*(t,i) \otimes h_{i+1}(t);$$

$$\varphi_x = \sum_{i=0}^{N-1} (2|u_{2x}(t,i)|^2 + |u_{2y}(t,i)|^2) \otimes h_{i+1}(t);$$

$$\varphi_y = \sum_{i=0}^{N-1} (2|u_{2y}(t,i)|^2 + |u_{2x}(t,i)|^2) \otimes h_{i+1}(t).$$

where, the meaning of each parameter is as described above, $w_{yx}$ is the crosstalk of the y polarization status to the x polarization status in the fiber span, $w_{xy}$ is the crosstalk of the x polarization status to the y polarization status in the fiber span, (o, is the phase noise of the XPM on the x polarization status, and $co_y$ is the phase noise of the XPM on the y polarization status.

In this embodiment, since the nonlinear effect is related to signal light power and the value of the signal light power is the maximum at the beginning of each fiber span, the nonlinear effect herein is the strongest. Due to the existence of the fiber loss, the signal light power will be reduced with the growth of propagation distance, thus the relative polarization status rotation between channels due to the PMD effect at the beginning of each fiber span is only taken into consideration in the embodiment of the present invention, such that the expression and calculation of the XPM impairments are both greatly simplified.

The apparatus for estimating XPM impairments including the PMD provided by the embodiments of the present invention is applicable to, but not limited to, various kinds of modulation formats, such as mPSK, mQAM, and mAPSK etc., and subcarrier multiplexing or OFDM technology.

On the basis of the apparatus for estimating XPM impairments in FIG. 1, the PMD-induced relative polarization status rotation between channels at one fiber span is considered into the embodiment of the present invention, thereby the impact of the PMD on the XPM can be simulated, such that the improved apparatus is more similar to a practical system. The apparatus for estimating XPM impairments of the embodiment of the present invention can quickly and accurately estimate the cross-phase modulation (XPM) impairments in the effect of the polarization mode dispersion.

The embodiment of the present invention further provides a method for estimating XPM impairments, and as described in the following embodiment 2, since the principle of the method for solving the problem is the same as that of the apparatus for estimating XPM impairments in embodiment 1, the specific implementation thereof can refer to the implementation of the apparatus of embodiment 1, and the similarities will not be described any further.

Embodiment 2

Figure 5:
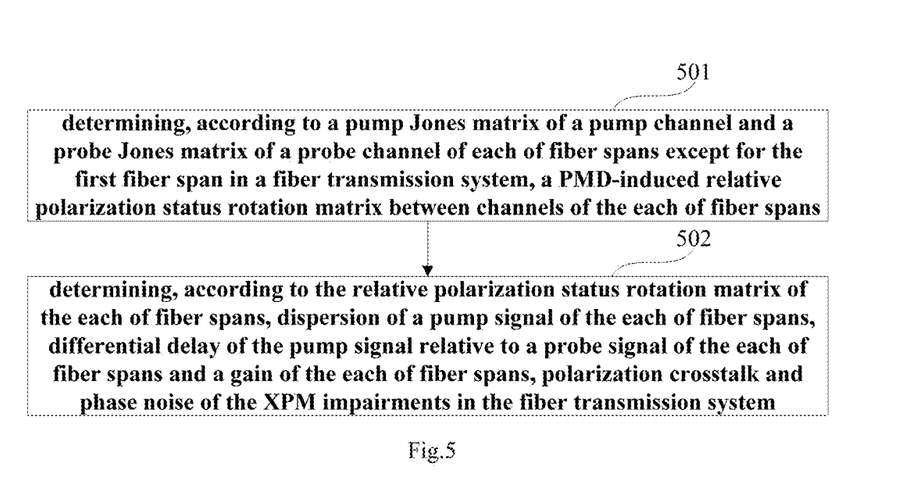
FIG. 5 is a flowchart of a method for estimating cross-phase modulation (XPM) impairments according to an embodiment of the present invention.

An embodiment of the present invention further provides a method for estimating cross-phase modulation (XPM) impairments. FIG. 5 is a flowchart of the method; referring to FIG. 5, the method comprises:

step 501: determining, according to a pump Jones matrix of a pump channel and a probe Jones matrix of a probe channel of each of fiber spans except for the first fiber span in a fiber transmission system, a polarization mode dispersion (PMD)-induced relative polarization status rotation matrix between channels of the each of fiber spans; and step 502: determining, according to the relative polarization status rotation matrix of the each of fiber spans, dispersion of a pump signal of the each of fiber spans, differential delay of the pump signal relative to a probe signal of the each of fiber spans and a gain of the each of fiber spans, polarization crosstalk and phase noise of the XPM impairments in the fiber transmission system.

In an example of step 501, particularly, the PMD-induced relative polarization status rotation matrix between channels of the each of fiber spans can be calculated according to the following formula:

$$J_{Relative} = \frac{J_{pump}}{J_{probe}} = \frac{\prod_{m=1}^{M}(R_m \times D_m)}{\prod_{m=1}^{M} R_m}$$

where $R_m$ is a random rotation matrix and $$R_m = \begin{bmatrix} \cos\theta & -\sin\theta e^{j\delta} \\ \sin\theta e^{-j\delta} & \cos\theta \end{bmatrix},$$

$D_m$ is a differential group delay matrix and $$D_m = \begin{bmatrix} e^{j\Delta\omega\tau/2} & 0 \\ 0 & e^{-j\Delta\omega\tau/2} \end{bmatrix},$$

M is the number of iterations, $\theta$ meets a uniform distribution on $[0,\pi]$, $\sin\delta$ meets a uniform distribution on $[-1,1]$, $\Delta\omega$ is a carrier interval between the pump signals and the probe signals, and $\Delta\omega=0$ for the probe signals, $\tau$ is a group delay difference of each of the iterations and $\tau=D_{PMD}\times\sqrt{L/M}$, $D_{PMD}$ is the coefficient of the PMD, and L is the length of a fiber span.

In another example of step 501, $\delta=0$, the PMD-induced relative polarization status rotation matrix between channels of the each of fiber spans can still be calculated according to the above formula, but where, $$R_m = \begin{bmatrix} \cos\theta & -\sin\theta \\ \sin\theta & \cos\theta \end{bmatrix}.$$

In an example of step 502, the step of determining polarization crosstalk and phase noise of the XPM impairments in the fiber transmission system comprises:

calculating the polarization crosstalk of the y polarization status of an input signal to the x polarization status thereof according to the formula $$w_{yx} = \sum_{i=0}^{N-1} j u_{2x}(t,i) u_{2y}^*(t,i) \otimes h_{i+1}(t);$$

calculating the polarization crosstalk of the x polarization status of an input signal to the y polarization status thereof according to the formula $$w_{xy} = \sum_{i=0}^{N-1} j u_{2y}(t,i) u_{2x}^*(t,i) \otimes h_{i+1}(t);$$

calculating the phase noise of the XPM on the x polarization status according to the formula $$\varphi_x = \sum_{i=0}^{N-1} (2|u_{2x}(t,i)|^2 + |u_{2y}(t,i)|^2) \otimes h_{i+1}(t);$$

and calculating the phase noise of the XPM on the y polarization status according to the formula $$\varphi_y = \sum_{i=0}^{N-1} (2|u_{2y}(t,i)|^2 + |u_{2x}(t,i)|^2) \otimes h_{i+1}(t);$$

where, $u_{2x}(t,i)=g_i u'_{2x}(t,i-1)\otimes \text{IFFT}(CD_i)\otimes \text{IFFT}(\tau_i);$ $u_{2y}(t,i)=g_i u'_{2y}(t,i-1)\otimes \text{IFFT}(CD_i)\otimes \text{IFFT}(\tau_i);$ where, the $u'_{2x}(t,i-1)$ and the $u'_{2y}(t,i-1)$ respectively are values after the $u_{2x}(t,i-1)$ and the $u_{2y}(t,i-1)$ being processed by the relative polarization status rotation matrix, that is, $u'_{2z}(t,i-1)=j_{11} \times u_{2x}(t,i-1)+j_{12} \times u_{2y}(t,i-1);$
$u'_{2y}(t,i-1)=j_{21} \times u_{2x}(t,i-1)+j_{22} \times u_{2y}(t,i-1);$ where, $h_{i+1}(t)=\text{IFFT}(H_{i+1}(\omega))$ is the impulse response of a filter; ⓧ represents the convolution;

$\text{IFFT}(CD_i)$ is the impulse response of the dispersion of the pump signals of the each of fiber spans; and $\text{IFFT}(\tau_i)$ is the impulse response of the differential delay of the pump signals relative to probe signals of the each of fiber spans.

According to the method of the embodiment of the present invention, the cross-phase modulation (XPM) impairments in the effect of the polarization mode dispersion can be quickly and accurately estimated.

Since the PMD effect is a random process, in order to verify the accuracy of the method and the apparatus provided by the embodiments of the present invention, it is the statistical properties of the cross-phase modulation effect should be investigated, such as the mean and variance of the nonlinear impairments. The particular method is to change the rotation matrix $R_i$ each time, i.e. number of seeds produced by the θ, perform the calculation repeatedly, and compare the obtained results with the results of a large number of simulation or experimental.

Figure 6:
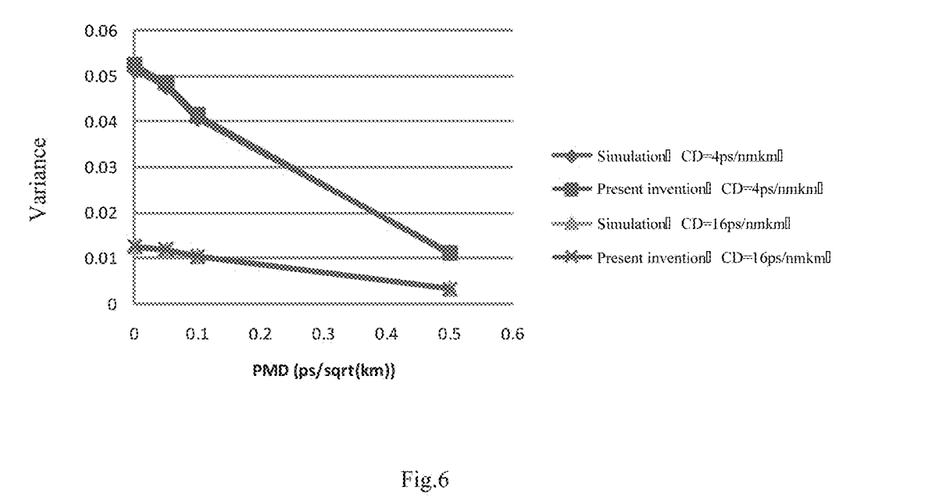
FIG. 6 is a schematic diagram of verification of performances.

FIG. 6 shows comparison of the model calculation results and SSF simulation software calculation results for the impact of the PMD on polarization crosstalk due to the XPM in two typical long-distance WDM coherent optical communication systems. It can be seen therefrom that the improved model can well illustrate the impact of the PMD on the systems.

An embodiment of the present invention further provides a computer-readable program, wherein when the program is executed in a channel estimation apparatus, the program enables the computer to carry out the method of embodiment 2 in the channel estimation apparatus.

An embodiment of the present invention further provides a storage medium in which a computer-readable program is stored, wherein the computer-readable program enables the computer to carry out the method of embodiment 2 in a channel estimation apparatus.

The preferred embodiments of the present invention are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. An apparatus for estimating cross-phase modulation (XPM) impairments, wherein the apparatus for estimating cross-phase modulation (XPM) impairments comprises:
   a first calculation unit for calculating, according to a pump Jones matrix of a pump channel signal and a probe Jones matrix of a probe channel signal of fiber spans except for a first fiber span in a fiber transmission system, a polarization mode dispersion (PMD)-induced relative polarization status rotation matrix between channel signals of the fiber spans; and
   a second calculation unit for calculating polarization crosstalk and phase noise of the XPM impairments in the fiber transmission system, according to the relative polarization status rotation matrix of the fiber spans, dispersion of a pump signal of the fiber spans, differential delay of the pump signal relative to a probe signal of the fiber spans and a gain of the fiber spans,
   wherein the second calculation unit comprises:
      N second calculation modules, the second calculation modules configured for calculating a polarization crosstalk term and a phase noise term of one fiber span;
      N filters, the filters configured for respectively performing the filtering processing on the phase noise term and the polarization crosstalk term of the fiber spans; and
      one adder for adding the filtering-processed phase noise terms of the fiber spans and adding the filtering-processed polarization crosstalk terms of the fiber spans to obtain the polarization crosstalk and the phase noise of the XMP impairments in the fiber transmission system;
   wherein N is a number of the fiber spans in the fiber transmission system; and
   wherein:
      the first second calculation module calculates the phase noise term and the polarization crosstalk term of the first fiber span according to the pump signals of the first fiber span; and
      the second calculation modules except for the first second calculation module calculate the phase noise term and the polarization crosstalk term of the fiber spans corresponding to the second calculation modules according to a product of the pump signal and the relative polarization status rotation matrix, the dispersion of the pump signal, the differential delay of the pump signal relative to the probe signal and the gain of the fiber spans corresponding to the second calculation modules.

2. The apparatus according to claim 1, wherein the first calculation unit comprises (N−1) first calculation modules, and the first calculation modules are configured for calculating the PMD-induced relative polarization status rotation matrix between channels of the fiber spans.

3. A method for estimating cross-phase modulation (XPM) impairments, wherein the method comprises:
   determining, according to a pump Jones matrix of a pump channel signal and a probe Jones matrix of a probe channel signal of fiber spans except for a first fiber span in a fiber transmission system, a polarization mode dispersion (PMD)-induced relative polarization status rotation matrix between channel signals of the fiber spans; and
   determining polarization crosstalk and phase noise of the XPM impairments in the fiber transmission system, according to the relative polarization status rotation matrix of the each of fiber spans, dispersion of a pump signal of the fiber spans, differential delay of the pump signal relative to a probe signal of the fiber spans and a gain of the fiber spans,
   wherein the determining of the polarization crosstalk and phase noise of the XPM impairments in the fiber transmission system comprises:
      calculating a polarization crosstalk term and a phase noise term of one fiber span by N second calculation modules;
      respectively performing the filtering processing on the phase noise term and the polarization crosstalk term of the fiber spans by N filters; and adding the filtering-processed phase noise terms of the fiber spans and adding the filtering-processed polarization crosstalk terms of the fiber spans to obtain the polarization crosstalk and the phase noise of the XMP impairments in the fiber transmission system by an adder;

wherein N is a number of the fiber spans in the fiber transmission system; and wherein:

the first second calculation module calculates the phase noise term and the polarization crosstalk term of the first fiber span according to the pump signals of the first fiber span; and the second calculation modules except for the first second calculation module calculate the phase noise term and the polarization crosstalk term of the fiber spans corresponding to the second calculation modules according to a product of the pump signal and the relative polarization status rotation matrix, the dispersion of the pump signal, the differential delay of the pump signal relative to the probe signal and the gain of the fiber spans corresponding to the second calculation modules.

4. The method according to claim 3, wherein the determining, of a PMD-induced relative polarization status rotation matrix between channels of the fiber spans comprises:

calculating the PMD-induced relative polarization status rotation matrix between channels of the fiber spans by (N−1) first calculation modules.

* * * * *